US012013325B2

(12) United States Patent
Poissant et al.

(10) Patent No.: US 12,013,325 B2
(45) Date of Patent: Jun. 18, 2024

(54) VIBRATIONAL VISCOSIMETER

(71) Applicant: PAD PERIPHERAL ADVANCED DESIGN INC., Saint-Bruno-de-Montarville (CA)

(72) Inventors: Daniel Poissant, Mont St-Hilaire (CA); Samuel Poissant, La Présentation (CA); Martin Gingras, Brossard (CA); Arnaud Derouet, Montréal (CA); Pierre-Louis Cyr, St-Bruno-de-Montarville (CA)

(73) Assignee: PAD PERIPHERAL ADVANCED DESIGN INC., Saint-Bruno-de-Montarville (CA)

( * ) Notice: Subject to any disclaimer, the term of this patent is extended or adjusted under 35 U.S.C. 154(b) by 70 days.

(21) Appl. No.: 18/049,542

(22) Filed: Oct. 25, 2022

(65) Prior Publication Data

US 2024/0133786 A1   Apr. 25, 2024

(51) Int. Cl.
*G01N 11/16* (2006.01)
*G01F 15/00* (2006.01)
(Continued)

(52) U.S. Cl.
CPC ......... *G01N 11/167* (2013.01); *G01F 15/006* (2013.01); *G01F 15/14* (2013.01);
(Continued)

(58) Field of Classification Search
CPC .... G01N 11/167; G01N 11/04; G01F 15/006; G01F 15/14; G01F 15/16; G01F 15/185
See application file for complete search history.

(56) References Cited

U.S. PATENT DOCUMENTS 3,349,604 A   10/1967  Banks
3,382,706 A   5/1968   Fitzgerald et al.
(Continued)

FOREIGN PATENT DOCUMENTS

CA   2018806 A1 *   6/1990
DE   102013102711 A1 *   9/2014   ........... G01F 1/8413
(Continued)

OTHER PUBLICATIONS

European Search Report issued in parent EP Application No. 222033477.9.

*Primary Examiner* — Francis C Gray
(74) *Attorney, Agent, or Firm* — LAVERY, DE BILLY, LLP; Gwendoline Bruneau

(57) ABSTRACT

A viscosity measurement system and method of fabrication thereof, the system comprising a measuring element and a housing, the measuring element comprising a base and a counterweight, forced oscillation generating means, a tube, and a rod; the base, the counterweight and the forced oscillation means being sealed in the housing; the tube extending out of the housing through an opening in a bottom wall of the housing; the forced oscillation generating means being connected to an electric board secured to a top wall of the housing opposite the bottom wall for excitation of the rod; and the rod extending within the tube and immerging of the housing for immersion, at least in part, in a fluid to be measured, wherein the counterweight is distant from the top wall and from lateral walls of the housing, and the base is supported by the bottom wall of the housing in such a way to simultaneously provide a rigid attachment on an outer circumference of the bottom wall and on a circumference of the opening in the bottom wall, and a flexible dampening attachment on a remaining interface between a bottom
(Continued)

surface of the base of the measuring element and an upper surface of the bottom wall of the housing.

18 Claims, 3 Drawing Sheets

(51) Int. Cl.
    *G01F 15/14*     (2006.01)
    *G01F 15/16*     (2006.01)
    *G01F 15/18*     (2006.01)
    *G01N 11/04*     (2006.01)

(52) U.S. Cl.
    CPC ............ *G01F 15/16* (2013.01); *G01F 15/185* (2013.01); *G01N 11/04* (2013.01)

(56) References Cited

U.S. PATENT DOCUMENTS

| | | | |
|---|---|---|---|
| 3,710,614 A | 1/1973 | Oppliger | |
| 3,712,117 A | 1/1973 | Fitzgerald et al. | |
| 3,762,429 A | 10/1973 | Fitzgerald et al. | |
| 4,388,823 A | 6/1983 | Garnaud et al. | |
| 4,517,830 A | 5/1985 | Gunn et al. | |
| 4,566,181 A | 2/1986 | Matusik et al. | |
| 4,868,849 A | 9/1989 | Tamaoki | |
| 5,317,908 A * | 6/1994 | Fitzgerald | G01N 11/162 73/54.25 |
| 5,569,843 A * | 10/1996 | Poissant | G01N 11/06 73/54.13 |
| 5,723,771 A * | 3/1998 | Miura | G01N 11/162 73/54.24 |
| 9,267,872 B2 * | 2/2016 | Haeusler | G01N 11/16 |
| 9,372,140 B2 * | 6/2016 | Sneujink | G01N 11/14 |
| 11,397,146 B2 | 7/2022 | Poissant et al. | |
| 2020/0400542 A1 | 12/2020 | Poissant et al. | |
| 2020/0400543 A1 * | 12/2020 | Poissant | G01N 11/16 |

FOREIGN PATENT DOCUMENTS

| | | | |
|---|---|---|---|
| EP | 0 282 251 | 2/1993 | |
| EP | 2 045 594 | 11/2017 | |
| EP | 3241011 B1 * | 1/2019 | ......... G01F 1/8431 |
| FR | 2 462 701 | 2/1983 | |
| WO | 95/13192 | 5/1995 | |
| WO | 98/09139 | 3/1998 | |

* cited by examiner

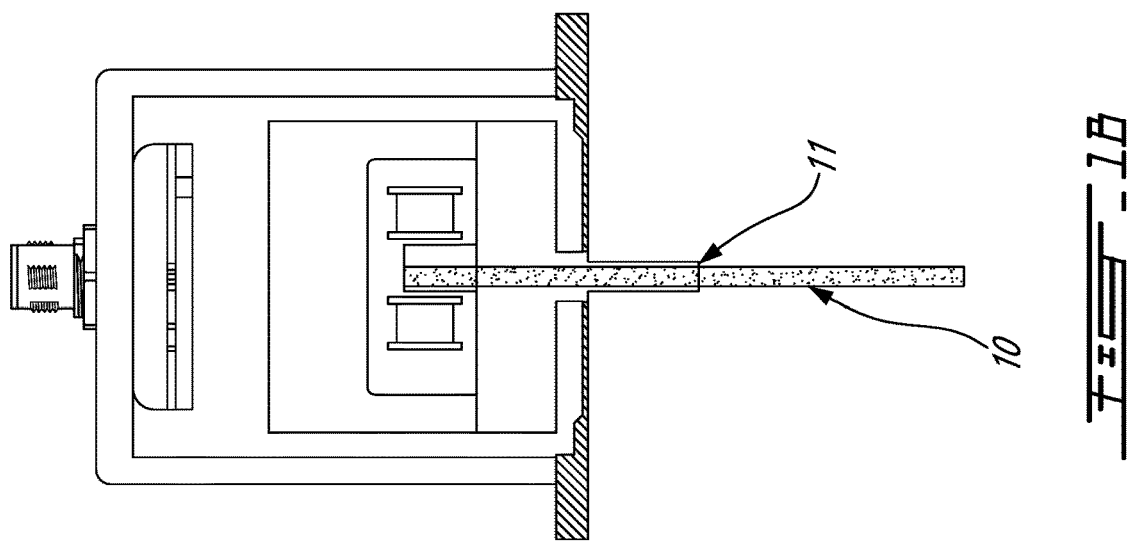
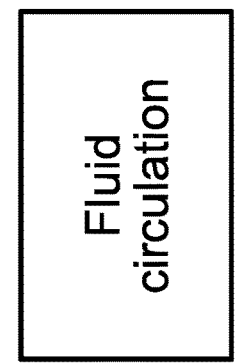
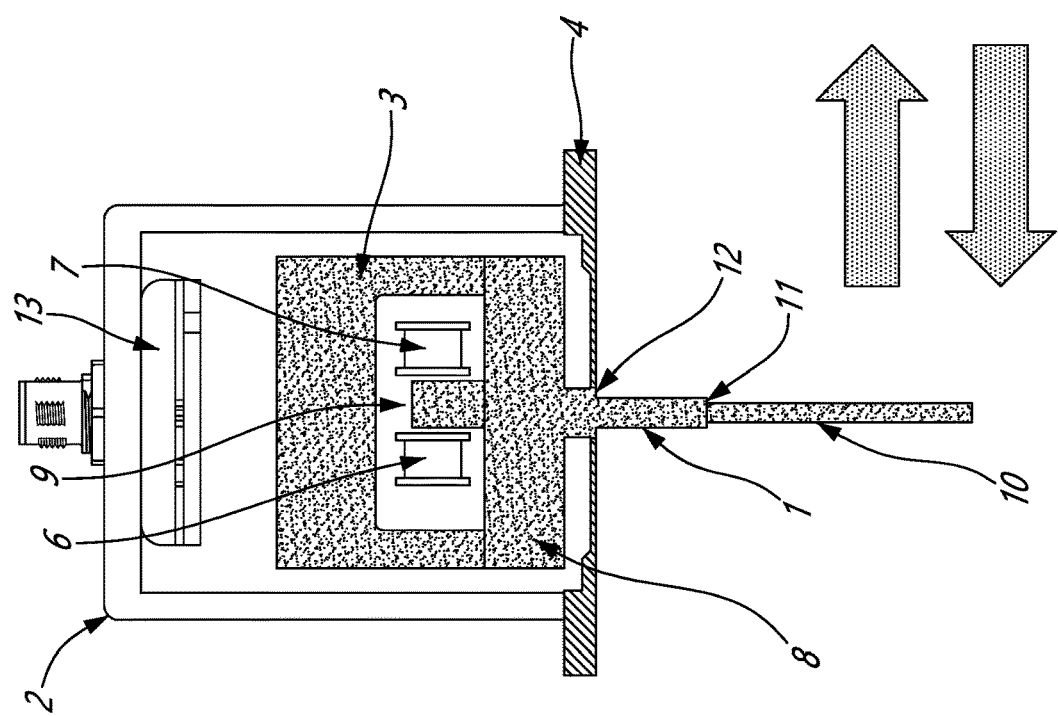

VIBRATIONAL VISCOSIMETER

FIELD OF THE INVENTION

The present invention relates to viscosity sensors. More precisely, the present invention relates to vibrational viscosimeters.

BACKGROUND OF THE INVENTION

Different fluids are more or less resistant to deformations depending on how viscous they are. Vibrating viscometers use a powered vibrating rod to measure viscosity. By measuring the dampening of the vibration of rod immersed in a fluid, or by measuring how quickly the vibration degrades, viscosity of the fluid can be determined.

Viscosity sensors using an oscillating element, the oscillating element is excited into oscillation and the maximum amplitude of the oscillations of the element in response is detected. The resonance of the oscillating element, which is used to determine the viscosity of the fluid in which the oscillating element is immersed, corresponds to a given phase shift and an amplitude dampening between the excitation signal and the response signal.

In a number of industries, such as printing for example, vibrational viscosimeters operate in harsh environments, and are submitted to hydraulic perturbations and pump bursts that affect the vibration system.

There is still a need in the art for a vibrational viscosimeter.

SUMMARY OF THE INVENTION

More specifically, in accordance with the present invention, there is provided a viscosity measurement system comprising a measuring element and a housing, the measuring element comprising a base and a counterweight, forced oscillation generating means, a tube, and a rod; the base, the counterweight and the forced oscillation means being sealed in the housing; the tube extending out of the housing through an opening in a bottom wall of the housing; the forced oscillation generating means being connected to an electric board secured to a top wall of the housing opposite the bottom wall for excitation of the rod; and the rod extending within the tube and immerging of the housing for immersion, at least in part, in a fluid to be measured, wherein the counterweight is distant from the top wall and from lateral walls of the housing, and the base is supported by the bottom wall of the housing in such a way to simultaneously provide a rigid attachment on an outer circumference of the bottom wall and on a circumference of the opening in the bottom wall, and a flexible dampening attachment on a remaining interface between a bottom surface of the base of the measuring element and an upper surface of the bottom wall of the housing.

There is further provided a method for fabrication a viscosity measurement system, comprising: providing a measuring element comprising a base and a counterweight, forced oscillation generating means, a tube, and a rod; providing a housing comprising a top wall, lateral walls and a bottom wall, the bottom wall comprising an opening and a thickness of the bottom wall of the housing being selectively decreased from an outer circumference thereof, then increased on a circumference of the opening; sealing the base, the counterweight and the forced oscillation means of the measuring element within the housing, with the counterweight positioned distant from the top wall and from the lateral walls of the housing and the tube extending out of the housing through the opening in the bottom wall of the housing; the forced oscillation generating means being connected to an electric board secured to the top wall of the housing for excitation of the rod; a second end of the rod extending out of the tube out of the housing, for immersion, at least in part, in the fluid; wherein the base is rigidly supported by the bottom wall of the housing on the outer circumference of the bottom wall and on the circumference of the opening in the bottom wall, while flexibly supported by the bottom wall between the outer circumference thereof and the circumference of the opening.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1A is a first schematic view of a system according to an embodiment of an aspect of the present disclosure;

FIG. 1B shows details of FIG. 1A;

DESCRIPTION OF EMBODIMENTS OF THE INVENTION

Figure 2:
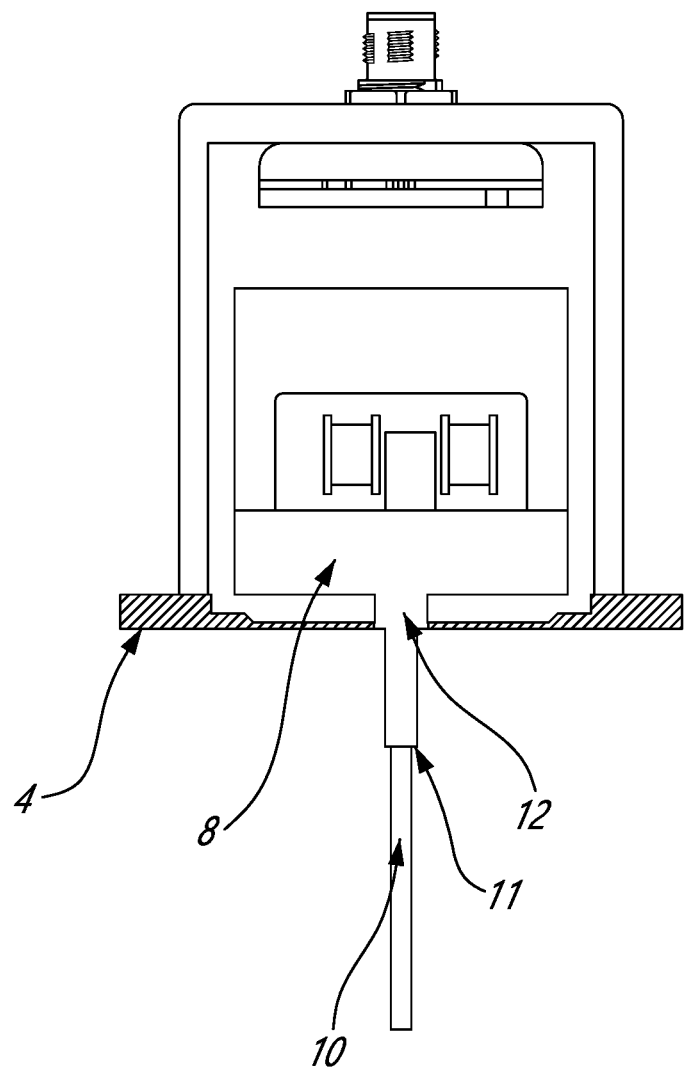
FIG. 2 show details of FIG. 1A.

The present invention is illustrated in further details by the following non-limiting examples.

The present disclosure describes a viscosimeter using a vibrating rod immersed in a fluid, and measuring the variation of the vibration amplitude. The rod vibration is triggered using a permanent magnet fixed at a first end of the vibrating rod and an excitation coil connected to an electrical oscillation circuitry via an amplifier. The detection is accomplished using a second coil or and Hall Effect sensor monitoring the vibration amplitude of the rod; the vibration amplitude is determined using the following relation:

$$\mu_\rho = K(Ea/Ex - C)^n$$

K is a constant on the driving force and the displacement; μ is the viscosity of the fluid, ρ is the density of the fluid; Ea is the rod vibration amplitude in air, Ex is the rod vibration amplitude in the measured fluid, and C is a constant derived from vibration parts.

The measured amplitude Ex varies according to the fluid's viscosity. After K is calculated using a reference fluid for which the viscosity and density are already known, $\mu_\rho$ can be derived by comparing Ea with Ex.

The vibration system consists of a positive-feedback amplification circuit loop and the drive voltage from the amplifier remains constant at all times. The rod's vibration frequency is influenced by the fluid in which it is immersed. The amplitude of the vibration is damped according to the characteristics of the measured fluid and this change in amplitude is converted into a voltage by the detection circuitry. This voltage is amplified through a process of synchronous rectification and then output as the viscosity signal.

A measuring element shown in grey [green] in FIG. 1A comprises a base 8 and a counterweight 3, forced oscillation generating means including a driver and a receiving coil 6 and 7 separated by a magnet 9, a tube 1, and a rod 10. The coils are connected to an electric board 13 (wiring not shown) secured to a top wall of the housing 2 opposite the flange 4 for excitation of the rod.

The base 8, the counterweight 3 and the forced oscillation means are enclosed in a housing 2. The tube 1 extends from between the coils down out of the housing 2 through an opening 12 in a bottom flange 4 of the housing 2.

The rod 10 runs from the top end of the tube 1 down within the tube 1 and out of the tube 1 outside of the housing 2 for immersion, at least in part, in the fluid to be measured (see fluid circulation FIG. 1A); it is secured by brazing or welding to an inner wall of the tube 1 at the bottom end 11 of the tube 1, the length of the rod within the tube 1 and the length of the rod extending out of the tube 1 below the end 11 of the tube 1 being free to oscillate about this rigid attachment to the tube.

In hydraulic systems comprising piston pump or double diaphragm pumps for example, hydraulic turbulences may interfere with measurements of the measuring element.

In the present disclosure, for isolation from such perturbations, the counterweight is distant from the top wall and from the lateral walls of the housing, and the base 8 is supported by the flange 4 of the housing in such a way to simultaneously provide a rigid attachment on the outer circumference of the flange and on the circumference of the opening in the flange, and a flexible dampening attachment on the remaining of the interface between the bottom surface of the base and the upper surface of the flange, as will now be described.

The flange is selected according to both issues of sealing of the measuring element against the environment and of isolation of the measuring element from vibrational perturbations. As shown in cross section in FIGS. 1, the thickness of the flange 4 is selectively decreased from the outer circumference of the flange, then increased on the circumference of the opening in the flange, and symmetrically on the other side of the opening (see FIG. 1B, FIG. 2), thereby in the shape of a ring cushion having a larger thickness on the outer circumference and on the circumference of the opening in the center thereof, and a reduced thickness in between these thicker parts. These selectively positioned thicker parts provide for a rigid attachment between the flange and the base, while the selectively positioned thinner part provides flexibility allowing the flange to flex without permanently deforming for dampening within a frequency spectrum targeted to filter parasitic external noise.

Variations in the thickness of the flange result in interfaces that limit wave transmission in a bidirectional way between the measuring element and the external environment.

The flange is thus selected as thin as possible for elasticity so as to dampen parasite frequencies close to the resonance frequency of the measuring element, typically about 400 Hz, in between these thicker parts of the flange of a thickness selected for sturdiness over a range of operation pressures.

The measuring element, thus shielded from external vibrations, is maintained unaffected by parasite vibrations and only reacts to the vibrations of the end of the rod immersed in the fluid to be measured, for accurate, reliable and repeatable fluid characteristics measurements.

The rod is rigidly attached by brazing or welding to the end 11 of the tube. The tube may be an integral part of the base. In an embodiment of an aspect of the present disclosure, the flange is first heated, and the tube is inserted within the opening 12 in the flange 4, so that upon cooling, the flange 4 contracts around the tube thereby forming a press fit attachment that ensures tightness and increases the resistance of the attachment of the tube to the flange 4, and the tube may be brazed or welded within the opening 7 in the flange 4. An harmonic wave (signal) generated in the length of the rod within the housing travels along the rod to the end of the rod extending out of the housing, ending up dampened by the fluid, and the resulting amplitude of the oscillation of the rod is measured in response via the receiving coil. The frequency of the rod may also be measured in order to determine the density of the fluid.

In the air, the vibration of the rod is solely the result of the movement imposed by the forced oscillation. Parasitic vibrations are mostly reflected by the attachment of the rod at the end 11 of the tube 1; since they are not transmitted to the rod, the rod oscillates without being impacted by the parasitic vibrations, caused by external elements such as pumps, motors and other components for example, depending on the operating conditions.

In the present disclosure, the measuring element is thus vibrationally uncoupled from the housing and external parasitic vibrations generated from the outside of the housing, as the flange dampens disturbances and prevents resonance phenomena.

In hydraulic systems comprising piston pump or double diaphragm pumps for example, hydraulic turbulences may interfere with measurements of the measuring element. As illustrated in FIGS. 1 and 2 for example, the measuring element, vibrationally uncoupled from the housing and external parasitic vibrations based use of the deformation of the flange and dampening of external vibration frequencies, is isolated from such perturbations.

Figure 3:
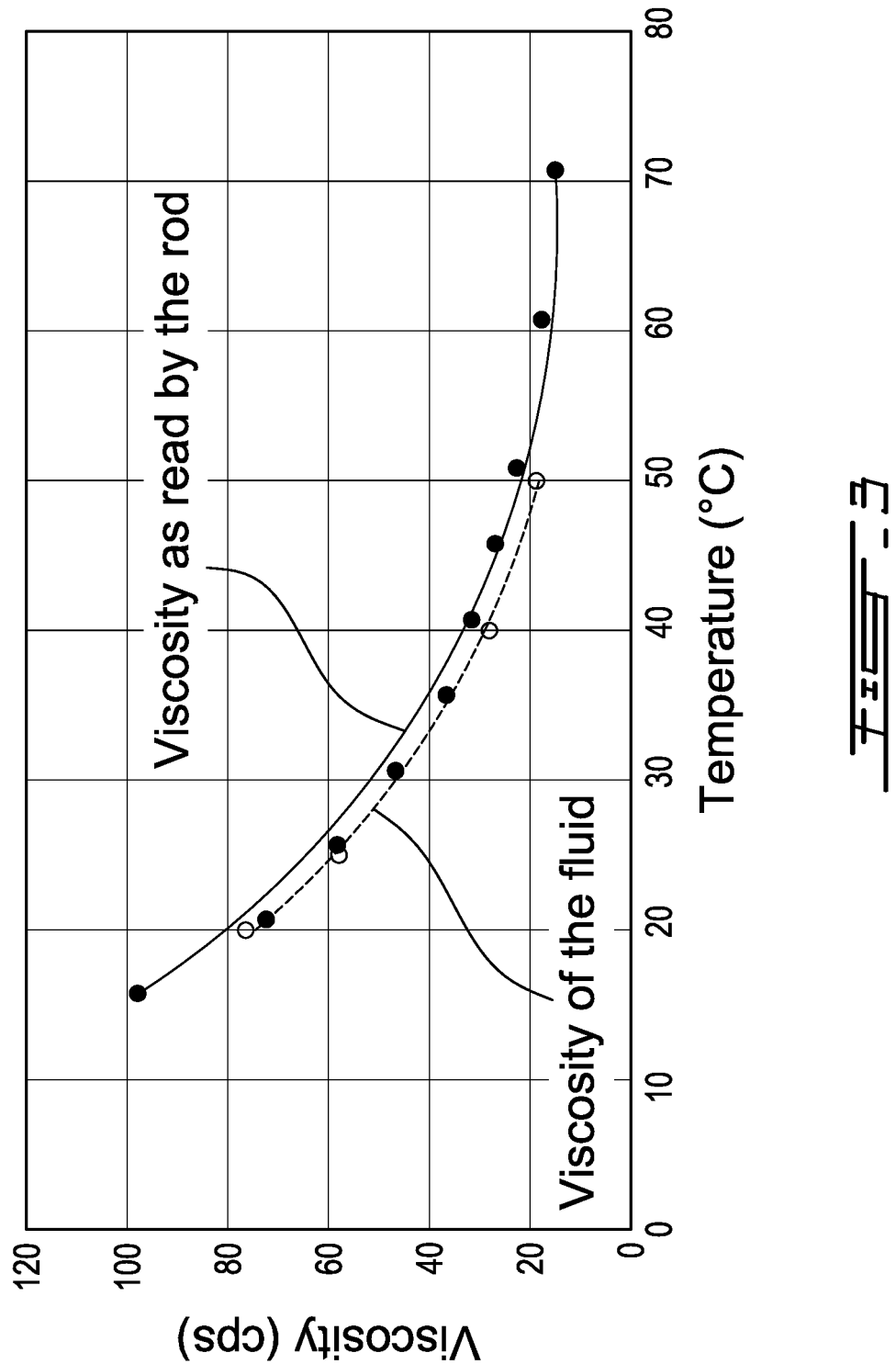
FIG. 3 shows viscosity of fluid as read by the rod as a function of temperature and the reference viscosity of the fluid as a function of temperature.

As illustrated in FIG. 3, for a viscosimeter calibrated at 20° C., there is an error in the readings at higher temperatures, up to 20% of the reading when the temperature exceeds 50° C. for example. FIG. 3 shows an example of the shift between the readings and the viscosity of a reference oil. In an embodiment of an aspect of the present disclosure, electronic thermal compensation is achieved, by determining the error and correcting the reading using the corrected error according to the temperature, taking into account the effect of temperature on the electronic components (board), of the forced oscillation means as well as on the selectively selected properties of the flange across its surface, in such a way to ensure the stable characteristics of the measuring element according to environmental thermal variation.

The present viscosimeter, while the measuring element is compact and lightweight, provides reliable, repeatable and continuous measurements of viscosity of the fluid to be measured, in a range from less than 1 CPS to several millions CPS (centipoise), in harsh environment, with pressures up to at least 100 psi (6.9 Bar), in environments categorised as non-hazardous areas up to hazardous areas Zone 0 Ex is (intrinsically safe) in a range of temperatures.

The determination of the viscosity of a fluid is done using the dampening of the oscillation of a rod immersed in the fluid by the fluid, based on a signal measured in volts converted into centipoises. The resolution of the signal thus depends on the accuracy of the measures of the voltage associated with the oscillation of the rod, and any parasitic vibration translates into a variation in the voltage of the read signal and consequently, into increased uncertainty in the measurement. The present disclosure teaches a method and a system yielding a stable read signal and thereby increased resolution.

The present disclosure teaches dampening external parasitic vibrations without attenuating the sensitivity of the amplitude of the signal used for determining the viscosity of the fluid, based on a vibrational decoupling of the measuring element from external parasitic vibrations, while achieving complete sealing from fluid.

The measuring element, shielded from external vibrations, only reacts to the vibrations of the end of the rod immersed in the fluid to be measured, thereby yielding accurate, reliable and repeatable fluid characteristics measurements.

A corrosion-resistant material, such as stainless steel, titanium, Hastelloy® and conductive material such as Teflon for example, depending of the fluid, may be selected as a material for the rod in contact with the fluid.

The housing may be made in a polymer, a plastic, a ferrous or non-ferrous material, or different grades of stainless steel or alloys such as Inconel™ for example.

Different mounting options may be considered for the viscosimeter in operation, including bench top or in situ using side bracket, base mount, pipe attachment such as strut channel pipe clamp for example.

The present method and system provide increased resolution of viscosity measurement, by preventing transmission of external vibrational energy from the housing to the measuring element, which may introduce signal distortion resulting in loss of resolution of instantaneous measurements.

The present method and system eliminate transmission links between the housing and the measuring element, by vibrationally decoupling the measuring element from the housing and the external environment while in operation in an environment.

To allow base of the measuring element while limiting the transmission of parasitic energy through a bandpass filter and a desired Q factor to eliminate the external interference frequencies, the thickness of the housing is selectively controlled to reach a target balance between flexibility for dampening within the frequency spectrum needed to filter the parasitic external noise, and solidity of the assembly, in a completely sealed configuration ensuring protection of the inner components within the housing from fluid infiltration.

To maintain the resolution and repeatability of the viscometer's measurements, the present method and system comprise compensating for behavioral changes depending on the environment by thermal compensation to maintain the precision of the measurements over a working temperature range of the viscometer.

The scope of the claims should not be limited by the embodiments set forth in the examples, but should be given the broadest interpretation consistent with the description as a whole.

What is claimed is:

1. A viscosity measurement system, comprising a measuring element and a housing, the measuring element comprising a base and a counterweight, forced oscillation generating means, a tube, and a rod; the base, the counterweight and the forced oscillation means being sealed in the housing; the tube extending out of the housing through an opening in a bottom wall of the housing; the forced oscillation generating means being connected to an electric board secured to a top wall of the housing opposite the bottom wall for excitation of the rod; the rod extending within the tube and immerging of the housing of the tube out for immersion, at least in part, in a fluid to be measured;
wherein the counterweight is distant from a top wall and from lateral walls of the housing, and the base is supported by the bottom wall of the housing in such a way to simultaneously provide a rigid attachment on an outer circumference of the bottom wall and on a circumference of the opening in the bottom wall, and a flexible dampening attachment on a remaining of an interface between a bottom surface of the base of the measuring element and an upper surface of the bottom wall of the housing.

2. The viscosity measurement system of claim 1, wherein a thickness of the bottom wall of the housing is selectively decreased from the outer circumference thereof, then increased on the circumference of the opening in the bottom wall.

3. The viscosity measurement system of claim 1, wherein the bottom wall has a thickness on the outer circumference thereof, a thickness on the circumference of the opening thereof, and a thickness between the outer circumference thereof and the circumference of the opening thereof, the thickness on the outer circumference and the thickness on the circumference of the opening being selected larger than the thickness between the outer circumference and the circumference of the opening.

4. The viscosity measurement system of claim 1, wherein the rod is secured by one of brazing and welding to an inner wall of the tube at the bottom end of the tube.

5. The viscosity measurement system of claim 1, wherein the tube an integral part of the base.

6. The viscosity measurement system of claim 1, wherein the tube is brazed or welded within the opening in the bottom wall.

7. The viscosity measurement system of claim 1, wherein the rod is in a corrosion-resistant material.

8. The viscosity measurement system of claim 1, wherein the rod is in one of: stainless steel, titanium, Hastelloy® and a conductive material.

9. The viscosity measurement system of claim 1, wherein the housing is in one of: a polymer, a plastic, a ferrous material, a non-ferrous material, a stainless steel and an alloy.

10. The viscosity measurement system of claim 1, the system being mounted, in operation, in one of: bench top, in situ, base mount, and pipe attachment.

11. A method for fabrication a viscosity measurement system, comprising:
providing a measuring element comprising a base and a counterweight, forced oscillation generating means, a tube, and a rod;
providing a housing comprising a top wall, lateral walls and a bottom wall, the bottom wall comprising an opening and a thickness of the bottom wall of the housing being selectively decreased from an outer circumference thereof, then increased on a circumference of the opening;
sealing the base, the counterweight and the forced oscillation means of the measuring element within the housing, with the counterweight positioned distant from the top wall and from the lateral walls of the housing and the tube extending out of the housing through the opening in the bottom wall of the housing; the forced oscillation generating means being connected to an electric board secured to the top wall of the housing for excitation of the rod; a second end of the rod extending out of the tube out of the housing, for immersion, at least in part, in the fluid;
wherein the base is rigidly supported by the bottom wall of the housing on the outer circumference of the bottom wall and on the circumference of the opening in the bottom wall, while flexibly supported by the bottom wall between the outer circumference thereof and the circumference of the opening.

12. The method of claim 11, comprising securing the rod to an inner wall of the tube at the bottom end of the tube by one of: brazing and welding.

13. The method of claim 11, comprising brazing or welding the tube within the opening in the bottom wall.

14. The method of claim 11, comprising forming the tube as an integral part of the base.

15. The method of claim 11, comprising selecting the rod in a corrosion-resistant material.

16. The method of claim 11, comprising selecting the rod in one of: stainless steel, titanium, Hastelloy® and conductive material.

17. The method of claim 11, comprising selecting a material of the housing in one of: a polymer, a plastic, a ferrous material, a non-ferrous material, a stainless steel and an alloy.

18. The method of claim 11, comprising mounting the system, for operation, in one of: bench top, in situ, base mount, and pipe attachment.

* * * * *